United States Patent [19]

Vitus et al.

[11] 4,426,495

[45] Jan. 17, 1984

[54] PREPARATION OF STAR POLYMERS

[75] Inventors: Francis J. Vitus; Ivan G. Hargis, both of Tallmadge; Russell A. Livigni; Sundar L. Aggarwal, both of Akron, all of Ohio

[73] Assignee: The General Tire & Rubber Company, Akron, Ohio

[21] Appl. No.: 421,700

[22] Filed: Sep. 22, 1982

Related U.S. Application Data

[62] Division of Ser. No. 282,671, Jul. 13, 1981, Pat. No. 4,409,368.

[51] Int. Cl.$^3$ .............................................. C08L 67/06
[52] U.S. Cl. ......................................... 525/92; 525/93
[58] Field of Search ..................... 525/64, 92, 84, 93

[56] References Cited

U.S. PATENT DOCUMENTS 3,674,893  7/1972  Nowak ................................. 525/92
4,329,438  5/1982  Yamori ................................. 525/64

Primary Examiner—Paul R. Michl

[57] ABSTRACT

Divinyl benzene and/or diisopropenyl benzene in hydrocarbon solvent is added over a period of time at low temperature to a hydrocarbon solvent containing a $C_{2-20}$ normal, secondary or tertiary alkyl or cycloalkyl lithium compound and a tertiary alkylamine having 2–4 carbon atoms prepared at low temperature to provide an initiator having an average of from 4 to 9 C-Li sites and a VPO $\overline{M}n$ of from about 750 to 4,000. These initiators a re useful in polymerizing dienes and vinyl monomers to provide star polymers having an average of from about 4 to 9 arms or branches. These star polymers among other things are useful low profile or low shrink additives for FRPs, e.g., glass fiber reinforced plastics.

6 Claims, No Drawings

PREPARATION OF STAR POLYMERS

This is a division of Application Ser. No. 06/282,671 filed July 13, 1981 now U.S. Pat. No. 4,409,368.

This invention relates to the preparation of Li initiators having an average of from about 4 to 9 carbon-lithium sites in the molecule and useful in the anionic solution polymerization of ethylenically unsaturated monomers like butadiene and styrene.

OBJECTS

An object of this invention is to provide a lithium initiator having an average of from about 4 to 9 carbon-lithium sites and a method for making the same.

Another object is to provide radial or star polymers having an average of from about 4 to 9 arms and a method for making the same.

Still another object is to provide thermosetting vinyl ester resin and polyester resin glass fiber molding compositions containing radial or star polymers having an average of from about 4 to 9 arms as low shrink additives.

These and other objects and advantages of the present invention will become more apparent to those skilled in the art from the following detailed description and examples.

SUMMARY OF THE INVENTION

According to the present invention low molecular weight tertiary amines are mixed with alkyl and cycloalkyl lithium compounds in hydrocarbon solvent at low temperature after which there is very slowly added at low temperatures with stirring to avoid substantial polymerization a diethylenically unsaturated benzene compound to provide a lithium initiator having an average of from about 4 to 9 carbon-lithium sites and a VPO $\overline{M}n$ of about 750 to 4,000. These initiators can then be used in anionic solution polymerization to polymerize ethylenically unsaturated monomers to provide radial or star polymers having an average of from about 4 to 9 arms or branches and having Li atoms on the ends of the arms or branches. If desired the Li atoms on the ends of the arms of the polymers can then be reacted with epoxides or $CO_2$ and then protonated or hydrolyzed to provide star polymers with OH or COOH groups on the ends of the arms and which are available for further reaction.

DISCUSSION OF DETAILS AND PREFERRED EMBODIMENTS

The initiator is prepared by adding the tertiary amine to the solution of the organolithium compound in a hydrocarbon solvent under an inert atmosphere. During addition, the mixture should be stirred and the temperature should be sufficiently low to avoid thermal decomposition of the organolithium compound. Desirably the temperature should be maintained at from about 0° to 25° C., preferably at from about 0° to 10° C. The molar ratio of the tertiary amine to the organolithium compound should be about 4 to 1. Next, to the solution of the tertiary amine and organolithium compound there is added under an inert atmosphere, very slowly, preferably dropwise, over an extended period of time with stirring, a solution in hydrocarbon solvent of the diethylenically unsaturated benzene compound in the same temperature ranges as noted above. The mole ratio of the organolithium compound to the diethylenically unsaturated benzene compound is about 6 to 5 or a ratio of 1:0.83. The moles of the diethylenically unsaturated benzene compound are based on the pure or essentially pure diethylenically unsaturated benzene compound and do not include any other materials present (such as in the case of divinyl benzene: ethyl vinyl benzene, diethyl benzene and so forth). These conditions for preparation of the initiator should be maintained to prevent formation of gel or to prevent polymerization and to obtain a hydrocarbon soluble initiator with an average of from about 4 to 9 carbon-lithium sites and a VPO $\overline{M}n$ of from about 750 to 4,000 for use in anionic polymerization.

The organolithium compound used in the present invention has the general formula RLi where R represents a normal, secondary or tertiary alkyl or cycloalkyl radical having from 2 to 20 carbon atoms. Examples of the organolithium compounds are ethyllithium, n-propyllithium, isopropyllithium, n-butyllithium, isobutyllithium, sec-butyllithium, tert-butyllithium, n-amyllithium, isoamyllithium, n-hexyllithium, 2-ethylhexyllithium, n-octyllithium, n-decyllithium, cyclopentyllithium, cyclohexyllithium, methylcylohexyllithium, cyclohexylethyllithium and the like and mixtures thereof. Preferably, R is an alkyl radical of from 2 to 10 carbon atoms, particularly sec-butyllithium.

The tertiary amine used in the preparation of the initiator should be a tertiary alkyl amine having from 2 to 4 carbon atoms in the alkyl group and should be liquid in the temperature range of from about 0° to 25° C. Examples of such amines are triethylamine, triisobutylamine, tripropylamine and the like and mixtures thereof. Of these amines, it is preferred to use triethylamine.

The diethylenically unsaturated benzene compound used can be 1,2-divinyl benzene, 1,3-divinyl benzene or 1,4-divinyl benzene or mixture thereof. The divinyl benzenes as obtained commercially generally contain from about 25 to 95% of the divinylbenzene or mixed isomers of divinyl benzene with the balance being substantially ethyl vinyl benzenes. Very small amounts of diethyl benzene, naphthalene and azulene, also, may be present with the divinyl benzene(s). Diisopropylenbenzene, also, can be used such as 1,2-diisopropenylbenzene, 1,3-diisopropenylbenzene and 1,4-diisopropenylbenzene and mixtures thereof. Mixtures of divinyl benzene(s) and diisopropenylbenzene(s) may be used. It is preferred to use divinylbenzene(s). Any monomeric compound present like ethylvinyl benzene enters into the initiator as part of the chain but does not lead to increased carbon-lithium functionality. Likewise, any non-reactive materials such as azulene and naphthalene possibly present in small quantities in the divinylbenzene merely act as diluents or solvents and can be stripped from the final polymer along with the removal of the polymerization solvent.

The solvent used for the preparation of the initiator should be a solvent for the organo lithium compound, tertiary amine and benzene compound so that a solution of the initiator may be obtained. Likewise, the solvent used for polymerization should be a solvent for the initiator, monomer and polymer obtained. Examples of solvents which may be used to obtain preferred high 1,4 polydiene microstructure are hydrocarbons like hexane, heptane, octane, isooctane, cyclohexane, cycloheptane, benzene, toluene, the xylenes and so forth. Mixtures of solvents may be used where they are compatible. The solvent preferably should not have a very labile carbon-hydrogen bond and should not act at least substantially as a chain transfer agent. The solvents should be liquids at temperatures of from about 0° to 120° C.

The inert atmosphere used in the preparation of the initiator and used during polymerization can be nitrogen, argon, helium, neon and so forth.

The ethylenically unsaturated polymerizable monomers to be polymerized using the initiators of the present invention are those having an activated unsaturated double bond, for example, those monomers where adjacent to the double bond there is a group more electrophilic than hydrogen and which is not easily removed by a strong base. Examples of such monomers are nitriles like acrylonitrile and methacrylonitrile; acrylates and alkacrylates like methyl acrylate, ethyl acrylate, butyl acrylate, ethyl hexyl acrylate, octyl acrylate, methyl methacrylate, ethyl methacrylate, butyl methacrylate, methyl ethacrylate, ethyl ethacrylate, butyl ethacrylate and octyl ethacrylate; the dienes such as butadiene-1,3, 2,3-dimethyl butadiene, piperylene and isoprene; and the vinyl benzenes like styrene, alpha methyl styrene, p-tertiary butyl styrene, divinyl benzene, methyl vinyl toluene and para vinyl toluene and the like and mixtures of the same. Preferred monomers to use are butadiene and mixtures of butadiene and styrene.

Depending on the monomer employed, the resulting star polymers can be rubbery, resinous, or thermoplastic. They, also, can be homopolymers, pure block copolymers or graded block copolymers. Random copolymers may be obtained by carefully adding (programming) monomer additions to the reactor. Alternatively, small amounts of randomizing agents like tetrahydrofuran may be used during polymerization. These star polymers as produced usually do not contain gel and have an average of from about 4 to 9 arms.

The obtained number-average molecular weight of the star polymer in the absence of chain transfer is controlled by the molecular weight calculated from the ratio of grams of monomer polymerized to moles of initiator charged. Conversions of monomer to polymer up to about 100% are obtained.

Temperatures during solution polymerization can vary from about 0° to 120° C. Preferably, polymerization temperatures are from about 20° to 80° C. Times for polymerization will be dependent on the temperature, amount of initiator, type of polymers desired and so forth. Only minor amounts of the initiator are necessary to effect polymerization. However, the amount of initiator employed may vary with the type of polymer desired. For example, in general, when making polymers having a high number average molecular weight using a given amount of monomer, only a small amount of the initiator is necessary whereas when making a low number average molecular weight polymer, larger amounts of the initiator are employed. Moreover, since the polymer is a living polymer, it will continue to grow as long as monomer is fed to the polymerization system. Thus, the molecular weight can be as high as several hundred thousand or even more. On the other hand, very high molecular weight polymers require lengthy polymerization times for a given amount of the initiator, and at lower initiator concentrations the polymerization rate may drop. A useful range of initiator to obtain readily processable polymers in practicable times is from about 0.00001 to 0.10, preferably from about 0.00033 to 0.005, mol of the initiator per 100 grams total of monomer(s).

The polymerization is conducted in a liquid hydrocarbon solvent. While bulk polymerization may be used, such presents heat transfer problems which should be avoided. In solvent polymerizations it is preferred to operate on a basis of not over about 15 to 20% polymer solids concentration in the solvent to enable ready heat transfer and processing.

Polymerization, of course, should be conducted in a closed reactor, such as a glass polymerization bottle, glass reaction flask or, preferably, a pressure reactor, fitted with a stirrer, heating and cooling means, with means to flush with or pump in an inert gas and so forth in order to polymerize under inert or non-reactive conditions, with means to charge monomer, solvent and initiator, venting means and with means to recover the resulting polymer and so forth. Small amounts of the initiator or of butyl lithium or other alkyl or cycloalkyl lithium compound may be added to the monomers and/or solvents prior to use as a scavenger to remove traces of water or other impurities which might adversely affect the polymerization. Alternatively or additionally, the monomers and/or solvents may be subject to reduced pressure or other treating agents to free them of water and other chain terminating agents.

The polyfunctional lithium initiator of this invention, also, may be used with the barium di(tert-alkoxide-hydroxide) salts of U.S. Pat. Nos. 3,992,561 and 4,260,712 and the barium salts of U.S. Pat. No. 3,629,213.

Since the star polymer in solution in the polymerization media is a living polymer or since the polymerization is a non-terminating polymerization (unless positively terminated by failure to add monomer or by adding a terminating agent such as methanol) and since the living polymer contains terminal lithium atoms, it can be treated with an epoxide like ethylene oxide or with $CO_2$ and then protonated or hydrolyzed to provide a polymer with terminal hydroxyl groups or carboxyl groups, respectively.

Polymerization may be terminated by adding water, alcohol or other agent to the polymeric solution. After the star polymer has been recovered from the solvent media and dried, a suitable antioxidant such as 2,6-di-tert-butyl-p-cresol or other antioxidant may be added to the same. However, the antioxidant may be applied to the polymeric solution before it is stripped of solvent.

The star polymers produced by the method of the present invention can be compounded and cured in the same manner as other plastic and rubbery polymers. For example, they can be mixed with sulfur or sulfur furnishing materials, peroxides, carbon black, $SiO_2$, $TiO_2$, $Sb_2O_3$, red iron oxide, other rubber fillers and pigments, tetramethyl or ethyl thiuram disulfide, benzothiazyl disulfide and rubber extending or processing mineral or petroleum oils and the like. Stabilizers, antioxidants, UV light absorbers and other antidegradants can be added to these polymers. They can also be blended with other polymers like natural rubber, butyl rubber, butadiene-styrene-acrylonitrile terpolymers, polychloroprene, SBR, polyurethane elastomers, polystyrene and so forth.

The star polymers produced by the method of the present invention can be used in making protective coatings for fabrics, films, gaskets, belts, hose, shoe soles and electric wire and cable insulation, and may be used as plasticizers and polymeric fillers for other plastics and rubbers. With large amounts of sulfur hard rubber products can be made.

The star polymers produced by the method of the present invention as pointed out above have an average of from about 4 to 9 arms with each arm containing a terminal Li atom. The polymer can then be protonated with an alcohol like methanol which forms LiOR and results in terminal

groups on the end of the arms. Alternatively, the Li containing polymer may be treated with ethylene oxide or propylene oxide and then protonated to provide the arms with hydroxyl end groups which then may be reacted with polyisocyanates such as tolylene diisocyanate or diphenylmethane-4,4'-diisocyanate to form polyurethanes. Also, the Li containing polymer may be reacted with $CO_2$ and then may be hydrolyzed to form COOH groups on the ends of the arms which then may be reacted with glycols to form polyesters. They, also, are useful in Fiber Reinforced Plastics (FRPs).

If desired these star polymers containing a Li atom on the end of each arm may be coupled with such coupling agents as silicon tetrachloride, 1,2-dichloroethane and so forth to form networks.

In particular, rubbery star copolymers prepared according to the teaching of the present invention having on the average of from about 4 to 9 arms and a number average molecular weight of from about 50,000 to 250,000 and comprising from about 10 to 40% by weight of styrene and from 90 to 60% by weight of butadiene-1,3 and which can be pure block, graded block or random copolymers, preferably pure block copolymers with styrene blocks on the ends of the arms, are useful as low profile or low shrink additives for FRPs, glass fiber reinforced plastics such as thermosetting polyester resin or vinyl ester resin glass fiber compositions. The amount by weight of the star polymer in the FRP is from about 5 to 15% by weight based on the total weight of the organic constituents in the FRP. An advantage of using the star polymer of this invention in the polyester or vinyl ester resin composition is that it has less tendency to increase the viscosity of the composition as compared to a linear or substantially linear polymer of about the same MW and chemical type.

The glass fiber reinforced thermoset plastic (FRP) can be a sheet molding compound (SMC) or a bulk molding (BMC), or other thermosetting FRP material as well as a high strength molding compound (HMC) or a thick molding compound. The FRP substrate can have from about 10 to 75% by weight of glass fibers. The SMC compound usually contains from about 25 to 30% by weight of glass fibers while the HMC compound may contain from about 55 to 60% by weight of glass fibers. The glass fiber reinforced thermoset plastic (FRP) substrate can be rigid or semirigid (may contain a flexibilizing moiety such as an adipate group in the polyester).

The thermosetting composition or composition which is added to or mixed with the glass fibers, also, can contain fillers, maturation agents, inhibitors, mold release agents, catalysts, antioxidants, plasticizers, crosslinking monomers, pigments, and so forth such as calcium carbonate, magnesium hydroxide, calcium hydroxide, magnesium oxide, zinc stearate, peroxide catalysts, benzoquinone, styrene, methylmethacrylate and so forth. Unsaturated polyesters useful in glass fiber thermosets are known as shown by "Modern Plastics Encyclopedia," 1975–1976, October, 1975, Vol. 52, No. 10A, McGraw-Hill, Inc., New York, pages 61, 62 and 105 to 107; "Modern Plastics Encyclopedia," 1979–1980, October, 1979, Volume 56, Number 10A, pages 55, 56, 58, 147 and 148, McGraw-Hill, Inc., New York, N.Y., and "Modern Plastics Encyclopedia," 1980–81, October, 1980, Volume 57, Number 10A, pages 59, 60, and 151 to 153, McGraw-Hill, Inc., New York, N.Y. Vinyl ester resins are known, for example, see "Heat Resistant Vinyl Ester Resins," Launikitis, Technical Bulletin SC:116-76, Shell Chemical Company, June, 1976; Shell Chemical Company Technical Bulletin SC:16-76 and U.S. Pat. No. 3,876,726 and elsewhere. These FRP compositions can be used in the manufacture of automobile parts such as grille and headlamp assemblies, deck hoods, fenders, door panels and roofs as well as in the manufacture of food trays, appliance and electrical components, furniture, machine covers and guards, bathroom components, structural panels and the like. The FRP parts or moldings further can be in-mold coated according to the teachings of U.S. Pat. Nos. 4,081,578; 4,189,517; 4,222,929 and 4,245,006.

The following examples will serve to illustrate the present invention with more particularity to those skilled in the art. In these examples, parts are part by weight unless otherwise noted.

EXAMPLE 1

Preparation of Soluble Polyfunctional Initiator at 8° C.

42.8 grams of secondary-butyllithium (s-BuLi) in solution in cyclohexane were charged by syringe to a pre-weighed, dry, argon-purged pint bottle to give 82.39 mmoles s-BuLi. This s-BuLi was purchased as a solution in cyclohexane from Foote Mineral Company and analyzed for carbon-lithium concentration prior to use. The solution was cooled with stirring to +5° C. in an ice-water bath, and 34.0 grams (0.336 mole) of triethylamine were added by syringe over a 30-minute time span. An exotherm was noticed, but the temperature was held between +5° to +10° C. by the triethylamine addition rate. The yellow s-BuLi solution darkened to orange with triethylamine addition. The molar ratio of TEA/s-BuLi was 4.08. 68.73 mls of divinylbenzene (DVB) (contained 68.66 mmoles or 8.95 g of DVB) solution in benzene (Foster Grant Company#) were added dropwise to the rapidly stirred s-BuLi/TEA solution over a six-hour time span under argon. The divinyl benzene amount is figured as divinyl benzene and does not include any ethyl vinyl benzene etc. Upon addition of the first few drops of DVB solution, a bright red color was seen. The color deepened throughout addition to a very deep red. The rate of addition was slowed for the last 20% of DVB solution. No evidence of insolubility was observed. The reaction mixture was held below +8° C. through the DVB addition. The total amount of DVB added was 68.66 mmoles to give a mole ratio of 6 s-BuLi/5 DVB. After the DVB addition was complete, the solution was allowed to slowly warm with stirring overnight. No change in appearance was seen, with the solution remaining homogeneous with no evidence of insolubles.

Foster Grant Company, Inc.—general sample—The DVB was vacuum distilled at 47°–49° C. and 0.8 mm pressure from dibutylmagnesium and the main cut divided. A small amount of the distillate was retained for analysis. The rest was diluted with dry benzene. Gas chromatography/Mass spectrometry (GC/MS) analysis assuming equal response gave the following results: 56.6% DVB (all isomers), 42.4% EVB, 0.7% naphthalene or azulene, 0.2% diethylbenzene and 0.1% hydrocarbons (hexane, cyclohexane) introduced with the dibutylmagnesium.

The addition product of divinylbenzene (and of ethylvinylbenzene, if present) and secondary-butyllithium is referred to as the adduct or initiator. When the solution is used, it is called the adduct or initiator solution.

A. Gel Permeation Chromatography (GPC) Analysis 1.2 grams of the adduct solution were added to 20 ml benzene (GPC) and addition of a drop of methanol caused the color to fade to pale yellow. No further color change was seen with the addition of a second drop of methanol. Two milliliters of this solution was injected into a Waters Associate GPC 200 equipped with the following columns: 2,000–5,000 Å, $3 \times 10^3$ Å, 400 Å and 250 Å. This column was assembled to give high resolution in the low molecular weight region. The sample was run in benzene at 45° C. It showed a broad polymodal molecular weight distribution.

B. Vapor Phase Osmometry (VPO)

20 ml of adduct solution were terminated by addition of methanol slowly to give a pale yellow solution (protonation). After dilution with 20 ml benzene, the hydrocarbon solution was extracted with dilute HCl followed by extraction with distilled water until the aqueous phase was neutral. The organic phase was passed through anhydrous MgSO$_4$ several times to give a clear yellow solution. The MgSO$_4$ was washed each time with benzene to avoid loss of protonated adduct. The recovered adduct solutions were combined, frozen, and the product collected after freeze-drying. The product was then vacuum-dried at +45° C. maximum. A yellow, tacky material was obtained. The number average molecular weight $\overline{M}n_{(vpo)}$ of this material was determined in benzene using a Hitachi Perkin-Elmer 115 Molecular Weight Apparatus. Benzil was used to calibrate the instrument. The $\overline{M}n_{(vpo)}$ found was 1450. This was in good agreement with the theoretical $\overline{M}n$ of 1571, based on complete reaction of s-BuLi with the vinyl groups of both divinylbenzene and ethylvinylbenzene present in the system.

C. Carbon-Lithium Determination

A sample of the adduct solution was withdrawn and terminated with hydroxyl tritiated n-propanol. The tritiated adduct was isolated, dried, total solids determined, and prepared for scintillation measurements. Tritium content was determined on a Packard #527 Liquid Scintillation Spectrometer. The activity of the tritiated n-propanol was determined the same day as reference. The carbon-lithium found was 3.447 mmoles/gram solids at a total solids of 14.8%. The theoretical carbon-lithium content was 4.05 mmoles/gram at 14.8% total solids.

D. Nuclear Magnetic Resonance

A portion of the protonated adduct (0.2 gram) from B, above, was dissolved in 2.0 grams deuterated benzene. Proton NMR spectra was obtained at 40° C. using a Varian A60-A NMR Spectrometer with tetramethylsilane as a reference. The ratio of s-Bu/DVB was found to be 0.95 versus 1.09 expected from carbon-lithium retention. No residual unsaturation was seen. The charge ratio was 6/5 or 1.2. The difference or C-Li loss is probably due to impurities.

E. Gas Chromatography

Gas chromatography was used to examine the polyfunctional initiator and a control of s-BuLi before and after termination. Samples of the vapor phase revealed that no butane increase was observed for the polyfunctional initiator upon protonation, indicating no residual s-BuLi. A large increase was seen with the s-BuLi control as expected. This shows all of the sec-BuLi was consumed in the initiator formation.

F. Determination of Average Functionality

The average functionality of the initiator or adduct was calculated from the number average molecular weight of the protonated initiator by vapor phase osmometry, and the equivalent weight ($\overline{M}e$) per C-Li group obtained by tritiation according to:

$$\text{Found Functionality} = \overline{M}n(vpo)/\overline{M}e(C\text{-Li}) = \text{grams per mole/grams per C-Li} = C\text{-Li/Mole} \quad \text{(Eq. 1)}$$

The average functionality of this initiator was 5.04 carbon-lithiums per mole (or molecule of initiator).

G. Aging Studies

Carbon-lithium analysis by tritiation was run just after the adduct preparation and three and one-half months later. In the interim, the initiator (adduct) was stored under argon pressure in a refrigerator (+5° C.), except when being sampled for polymerization reactions. Over the 3½ months, the active carbon-lithium content decreased from 3.48 meq C-Li/gram of solids to 3.38 meq C-Li/gram of solids, a decrease of only 2.8%. Room temperature aging studies were undertaken. A portion of the initiator was transferred to a clean, dry bottle and carbon-lithium content determined periodically over a two-week time span. Between sampling, the initiator was stored at room temperature under an inert atmosphere. After 14 days, a continuous loss of active carbon-lithium from 3.38 meq C-Li/gram of solids to 3.13 meq C-Li/gram of solids was seen. This represents a 7.4% decrease in activity. It should be noted that some loss of C-Li activity is potentially possible due to adventitious termination during the multiple samplings of a relatively small portion of initiator.

These results confirm the preparation of a polyfunctional initiator which is relatively stable when stored at 5° C.

EXAMPLE 2

Attempted Preparation of a Polyfunctional Initiator in the Absence of Triethylamine This was an attempt to form an adduct (6 s-BuLi/5 DVB) in the absence of triethylamine, and emphasizes the need for the amine solubilizing agent. 30 mls of a 1.288 meq/ml solution of sec-BuLi in cyclohexane to give 38.64 meq sec-BuLi were charged by syringe to a pre-weighed, argon-purged pint bottle. The solution was cooled to +7° C. using an ice-water bath. 29.35 mls of a DVB solution in benzene were added dropwise over the course of three hours under argon. Suddenly, after the three hours, with the addition of several more drops, the bright, red reaction solution formed a gel-like mass. At this point, the mole ratio of s-BuLi/DVB was 1.65. No further addition of DVB solution was made. Triethylamine was added to the solution (4 TEA/1 s-BuLi) and some break-up of the gel-like consistency occurred along with a deepening of color intensity. Over the next two hours, chunks of gel-like material were still in evidence. No characterization was obtained due to insolubility.

EXAMPLE 3

Preparation of a Polyfunctional Initiator at 22° C. in the Presence of Triethylamine 32.0 grams of s-BuLi solution in cyclohexane were charged by syringe to a pre-weighed, dry, argon-purged pint bottle to give 62.24 mmoles s-BuLi, which had been purchased from Foote Mineral Company and analyzed for carbon-lithium content prior to use. The solution was cooled in an ice-water bath and 25.8 grams of triethylamine were added over 30 minutes with stirring. The molar ratio of TEA/s-BuLi was 4.1. The orange-yellow solution was warmed to +22° C. 139.1 mls of divinylbenzene solution in benzene (Dow Chemical Company DVB##) were added dropwise under argon to the stirred s-BuLi/TEA solution over six hours. The mole ratio of s-BuLi/DVB was about 6/5. A deep red, clear solution was in evidence. The solution was allowed to remain at room temperature overnight. No apparent change was seen.

Dow Chemical Company—general samples—The DVB was vacuum distilled from CaH$_2$ and was subsequently diluted with dry benzene. GC/MS analysis assuming equal response gave the following results: 52.4% DVB (all isomers), 45.3% EVB, 1.8% diethylbenzene and 0.5% naphthalene.

Adduct Characterization

The procedures described in detail in Example 1 were followed. The GPC curve revealed a buildup of high molecular weight material. The average functionality of this adduct (calculated from equation 1) was 8.81. Its VPO $\overline{M}n$ was 2908.

EXAMPLE 4

Preparation of a Polyfunctional Initiator at 7° C. in the Presence of Triethylamine 19.4 grams of s-BuLi solution in cyclohexane were charged by syringe to a pre-weighed, dry, argon-purged pint bottle to give 37.33 mmoles s-BuLi which had been purchased from Foote Mineral Company and analyzed for carbon-lithium content prior to use. The solution was cooled using an ice-water bath and 15.41 grams of triethylamine were added over a 30-minute time span with stirring. The maximum temperature of the solution was +8° C. The molar ratio of TEA/s-BuLi was 4.08. 83.4 mls divinylbenzene solution in benzene (Dow Chemical Company DVB) were added under argon dropwise to the rapidly stirred s-BuLi/TEA solution over six hours. The maximum temperature during the DVB addition was +7° C. The mole ratio of s-BuLi/DVB was about 6/5. The deep red, clear solution was packed in ice but was allowed to warm overnight. In the morning, no charge was observed.

Adduct Characterization

The procedures described in detail in Example 1 were followed. The GPC curve shows less high molecular weight buildup than for Example 3 which was prepared at +22° C. The average functionality of this adduct (calculated from equation 1) was 6.3. Its VPO $\overline{M}n$ was 2000.

EXAMPLE 5

Preparation of Omega-Reactive Radial Polymers,

Preparation of Hydroxyl-terminated Polybutadiene 1.5 grams (0.306 mmole CLi) of divinylbenzene/sec-butyllithium adduct (initiator) solution (f=4.85) were added dropwise by syringe to a solution of 434.9 grams toluene (sieve-dried) and 45.2 grams (0.836 mole) sieve-dried butadiene in a dry, argon-purged quart polymerization bottle until a pale yellow color indicating active carbon-lithium was produced. The presence of active carbon-lithium was taken to indicate the successful titration (scavenging) of impurities in the system. After this, an additional 35.2 grams of adduct solution (7.18 mmoles CLi) were added to effect polymerization. The bottle contained a deep red, clear solution. The polymerization was carried out overnight at 30° C. with mixing. A viscous, slightly turbid orange solution resulted. The conversion was about 100%.

9.7 grams ethylene oxide solution in toluene were added by syringe to give 15.69 mmoles EO (2.19 EO/CLi). The contents were vigorously shaken and a highly associated gel-like mass was formed, accompanied by color loss, locally throughout the solution. The presence of less viscous colored areas indicated incomplete mixing. After several days at 30° C., an apparently uniform gel-like mass was found. A small amount of more mobile fluid was present.

20 mls methanol were added, effecting an immediate loss of viscosity to give a clear, colorless, slightly viscous solution to form OH groups on the end of the polymer and LiOCH$_3$. The polymer was precipitated in excess methanol and analyzed, after isolation and vacuum drying, for microstructure and hydroxyl content. The polybutadiene microstructure was established by nuclear magnetic resonance ($^{13}$C NMR) to be 40.3% trans-1,4, 25.3% cis-1,4 and 34.4% vinyl for this low molecular weight polymer. The hydroxyl content of this polymer was found to be 0.156 mmole OH/gram polymer. This corresponds to an average of 4.7 hydroxyls per molecule. This value was established using the following formula, Equation 2:

Hydroxyl Functionality =

$$\frac{\text{mmoles OH/gram polymer}}{\text{mmoles CLi charges/gram polymer}} \times$$

average functionality of initiator

This OH containing polymer exhibited the following: $\overline{M}n=40,000$, $\overline{M}w=60,000$, H.I.=1.51 by GPC and $\overline{M}n=33,000$ by VPO.

11.78 grams of this OH containing star polymer were dissolved in 9.61 grams of toluene and mixed with 5.61 grams of a solution of 4,4'-diisocyanato diphenyl methane in toluene (1.2 NCO/OH) and 0.081 gram stannous octoate catalyst (T-9). A film was cast on Teflon using a 0.040-inch spacer bar. The system was cured under nitrogen at 65° C. for two hours to crosslink and chain extend the polymer and evaporate the solvent and to give a pale yellow film. This film had an ultimate tensile strength of 0.714 megapascal at 400% elongation.

EXAMPLE 6

Preparation of a Linear Hydroxyl-terminated Polybutadiene Control 0.4 gram of dilithioisoprene (Lithium Corporation of America, f=2) solution (0.41 mmole CLi) in toluene containing a small amount of triethyl amine was added dropwise by syringe to a solution of 463.2 grams toluene and 76.0 grams butadiene in a dry, argon-purged quart polymerization bottle to color end-point. The presence of color, indicating active carbon-lithium, signified titration of impurities in the system. Immediately, an additional 15.7 grams dilithioisoprene initiator (16.1 mmoles CLi) solution were added for polymerization to give an orange, slightly turbid solution. The polymerization was effected overnight at 30° C. to give a clear, yellow polymer solution. The conversion was about 100%.

19.3 grams ethylene oxide solution in toluene were added to give 31.23 mmoles EO (1.94 EO/CLi). The contents were shaken and a gel-like mass was formed concurrent with fading of the color. After several days, a uniform gel-like mass was obtained with only a small amount of more mobile fluid in evidence.

The addition of 20 mls methanol effected a marked loss in viscosity to give a fluid, colorless solution. The polymer was precipitated and analyzed, after isolation and vacuum-drying, for hydroxyl content, which was found to be 0.184 mmole OH/gram polymer. This corresponds to an average of 1.73 hydroxyls per molecule according to equation 2, assuming the functionality of the dilithioisoprene initiator equals 2. This OH containing polymer exhibited the following: $\overline{M}n = 17,000$, $\overline{M}w = 22,000$ and H.I. = 1.32 by GPC and $\overline{M}n = 8,900$ by VPO.

10.14 grams of this OH containing polymer dissolved in 10.31 grams of toluene were mixed with 5.7 grams of a solution (1.2 NCO/OH) of 4,4'-diisocyanato diphenyl methane in toluene and 0.078 gram stannous-octoate catalyst (T-9). A film was cast on Teflon using a 0.040-inch spacer bar. The system was cured under nitrogen at 65° C. to give a pale yellow film. This film had an ultimate tensile strength of 0.324 megapascal at 410% elongation.

This comparison shows the higher tensile strength of the star hydroxyl-terminated polybutadiene over its linear counterpart in isocyanate extensions.

EXAMPLE 7

Preparation of Hydroxyl-terminated Polystyrene

Five drops (approximately 0.5 gram, 0.3 mmole CLi) of divinyl-benzene/sec-butyllithium adduct or initiator solution (f=4.815) were added dropwise by syringe to a solution of 76.7 grams styrene and 568.0 grams sieve-dried toluene in a dry, argon-purged polymerization bottle to a pale yellow color end-point indicating active carbon-lithium and successful titration of impurities in the system. Immediately, 28.2 grams of the adduct or initiator solution (17.22 mmoles CLi) were added to effect polymerization. A deep red solution with some small gel-like particles was observed. When inspected after 2½ hours at 25° C., the deep red solution contained no evidence of insolubles. The bottle was rotated at 25° C. overnight to reveal no obvious change in appearance in the morning. The conversion was about 100%.

21.29 grams of ethylene oxide stock solution in sieve-dried toluene were added to give 34.44 mmoles ethylene oxide (2 EO/CLi). With vigorous shaking, a rapid buildup of highly associated gel-like particles of pale orange uniform color was observed. After rotation at 25° C. overnight, some color remained. After rotation at 50° C. overnight, a clear, colorless, highly associated mass was in evidence.

10 mls methanol were added and, with shaking, a loss of association to give a clear, colorless, slightly viscous solution occurred. The polymer was precipitated in acidified methanol, redissolved in warm cyclohexane and reprecipitated in methanol. The solvent was removed and the polymer redissolved in warm cyclohexane and subsequently freeze-dried. 79.5 grams of polymer were recovered versus 81.7 grams theoretical (including incorporated initiator). The hydroxyl content of this polymer was found to be 0.136 mmole OH/gram polymer, which corresponds to an average of 3.10 hydroxyls per molecule (Eq. 2). This OH containing polymer exhibited a $\overline{M}n$ of 17,900 by VPO.

EXAMPLE 8

Preparation of Carboxyl-terminated Styrene-Butadiene-Styrene Block Copolymer 0.23 gram of divinylbenzene-sec-butyllithium adduct or initiator solution (f=4.85) to give 0.046 mmole CLi was added dropwise by syringe to a solution of 10.0 grams sieve-dried butadiene and 490.8 grams sieve-dried toluene in a dry, argon-purged quart polymerization bottle to a pale yellow end-point, indicating successful titration of impurities in the system. Promptly, 11.33 grams of adduct or initiator solution (2.25 mmoles CLi) were added to effect polymerization. A clear red solution was in evidence. The bottle was charged to a 30° C. rotating bath overnight. In the morning, the solution was pale orange and slightly turbid. 16.3 grams of styrene monomer (distilled from Bu₂Mg) were added and allowed to react with rotation at 30° C. overnight. In the morning, an orange solution was found.

The majority of the solution was transferred under argon into 200 ml of sieve-dried tetrahydrofuran which had been saturated with dry carbon dioxide. Throughout the transfer, a vigorous carbon dioxide purge was maintained at the addition site by needle, with the polymer solution inlet held below the liquid surface. Agitation by magnetic stirring bar mixed the solution. Color loss at the addition site occurred instantly with no evidence of unreacted lithium carbanion found.

The polymer was precipitated in excess methanol and dried under vacuum. Carboxyl content was determined to be 0.0356 mmole COOH/gram polymer or an average of 3.3 carboxyls per molecule, based on equation 2, with mmoles carboxyl substituted for mmoles OH.

In this polymer as initially prepared, each arm extending from the initiator nucleus has a polybutadiene block then a polystyrene block terminating in C-Li. Thus from the end of one arm to the end of another arm there is provided

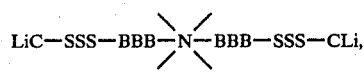

N being the nucleus from the initiator.

EXAMPLE 9

The following thermosetting polyester glass fiber compositions were prepared:

| Ingredient | Parts By Weight | | | |
|---|---|---|---|---|
| | I | II | III | IV |
| Polyester resin (70% by wt polypropylene fumarate (acid no. of 20 and | 210 | 210 | 210 | 210 |

-continued

| Ingredient | Parts By Weight | | | |
|---|---|---|---|---|
| | I | II | III | IV |
| OH no. of 30) and 30% by wt. styrene) | | | | |
| 10% by wt benzoquinone in styrene | 1.8 | .17 | .17 | .17 |
| Styrene | 10.5 | 50 | 50 | 50 |
| Mixture of 70% by wt. of styrene and 30% by wt. of polymethyl-methacrylate | 138 | — | — | — |
| MgO ("Maglite" D) | 5.7 | — | — | — |
| Zinc Stearate | 18 | 18.4 | 18.4 | 18.4 |
| CaCO$_3$ ("Camel-Wite, " Campbell Grove Div. of H.M. Royal) | 525 | 525 | 525 | 525 |
| Tertiary Butyl Perbenzoate | 2.7 | 2.7 | 2.7 | 2.7 |
| Mixture of 70% by wt. of styrene and 30% by wt. of carboxylated Bd-Sty, approx. 15% styrene, and approx m.w. of 100,000, block copolymer, ("Solprene" 312, Phillips Chem. Co., a Div. of Phillips Pet. Co., contains stabilizer and stearic acid) | — | 140 | — | — |
| Mixture of 70% by wt. of styrene and 30% by wt. of Bd-Sty star block copolymer of this invention* | — | — | 140 | — |
| Mixture of 70% by wt. styrene and 30% by wt. of carboxy terminated Bd-Sty star block copolymer of this invention** | — | — | — | 140 |
| Mixture of MgO in a plasticizer | — | 17.6 | 17.6 | 17.6 |
| Glass Mat | 242 | 242 | 242 | 242 |

*Bd-Sty, star block copolymer, 16% by wt. of styrene, $\overline{Mn}$ = 93,200 based on charge. Tg = −89.2° C. No active end groups, protonated.
**Carboxy terminated Bd-Sty star block copolymer, 15.3% by wt. of styrene, Tg = −88.6° C., $\overline{Mn}$ = 91,500 based on charge, carboxyl content 0.0234 meq/gm polymer of 0.0608 meq/gm theo., 38.5% carboxyl converted, 2.11 carboxyl groups per molecule (average).

The above compositions contained from 10.5 to 11.3% of the low profile additives.

The above ingredients except the glass were mixed together, and the resulting mixtures were forced into the glass mats at 80 lbs. pressure for 3 minutes. Samples of the resulting glass impregnated mats were then compression molded at about 300° F. (149° C.) and 1000 p.s.i. to form cured FRP samples which were then tested as shown in the Table below:

TABLE

| Moldings From Composition | Shrinkage | Flex Modulus PSI × $10^6$ | Flex Strength PSI × $10^4$ | Tensile PSI × $10^4$ | Elongation % | Izod Impact Ft. lb/in notch |
|---|---|---|---|---|---|---|
| I | .08 | 1.75 | 2.74 | 1.10 | 2.2 | 9.3 |
| II | .04 | 1.44 | 2.24 | 1.21 | 2.9 | 14.6 |
| III | .08 | 1.40 | 2.05 | 1.03 | 2.8 | 11.9 |
| IV | .08 | 1.39 | 1.94 | .69 | 1.6 | 12.2 |

From these results, it is demonstrated that the polymers of this invention are useful low shrink additives in FRPs.

We claim:

1. A thermosetting composition selected from the group consisting of thermosetting polyester resins and thermosetting vinyl ester resins containing crosslinking monomers and having from about 5 to 15% by weight based on the total weight of the composition of a rubbery star copolymer having an average of from about 4 to 9 arms, having a $\overline{Mn}$ of from about 50,000 to 250,000, comprising from about 10 to 40% by weight of styrene and from 90 to 60% by weight of butadiene-1,3 and having a nucleus from an initiator (1) having a VPO $\overline{Mn}$ of from about 750 to 4,000, (2) having from 4 to 9 C-Li sites and (3) being the adduct of an aromatic compound selected from the group consisting of divinyl benzene and diisopropenyl benzene and mixtures thereof and RLi where R is selected from the group consisting of normal, secondary and tertiary alkyl and cycloalkyl radicals of from 2 to 20, or from 2 to 10, carbon atoms and mixtures thereof, the mole ratio of RLi to said aromatic compound being about 1:0.83.

2. A thermosetting composition according to claim 1 in which said star polymer is a block copolymer and where the end portions of the arms comprise polystyrene blocks.

3. A thermosetting composition according to claim 2 wherein the star polymer contains terminal carboxyl groups.

4. A molded thermoset glass fiber composition selected from the group consisting of thermoset polyester resin glass fiber compositions and thermoset vinyl ester resin glass fiber compositions having about 10 to 75% by weight of glass fibers and containing from about 5 to 15% by weight based on the total weight of the organic constitutents of the composition of a rubbery star copolymer having an average of from about 4 to 9 arms, a $\overline{Mn}$ of from about 50,000 to 250,000, comprising from about 10 to 40% by weight of styrene and from 90 to 60% by weight of butadiene-1,3 and having a nucleus from an initiator (1) having a VPO $\overline{Mn}$ of from about 750 to 4,000, (2) having from 4 to 9 C-Li sites and (3) being the adduct of an aromatic compound selected from the group consisting of divinyl benzene and diisopropenyl benzene and mixtures thereof and RLi where R is selected from the group consisting of normal, secondary and tertiary alkyl and cycloalkyl radicals of from 2 to 20, or from 2 to 10, carbon atoms and mixtures thereof, the mole ratio of RLi to said aromatic compound being about 1:0.83.

5. A molded thermoset glass fiber composition according to claim 4 where said star copolymer is a block copolymer and where the end portions of the arms comprise polystyrene blocks.

6. A molded thermoset glass fiber composition according to claim 5 in which the star copolymer contains terminal carboxyl groups.

* * * * *